United States Patent
Fechner et al.

(10) Patent No.: US 8,113,537 B2
(45) Date of Patent: Feb. 14, 2012

(54) AIRBAG MODULE

(75) Inventors: Tobias Fechner, Aschaffenburg T.F. (DE); Norbert Sahm, Aschaffenburg (DE); Christian Kempe, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/957,161

(22) Filed: Nov. 30, 2010

(65) Prior Publication Data

US 2011/0068563 A1 Mar. 24, 2011

Related U.S. Application Data

(63) Continuation of application No. PCT/EP2009/056076, filed on May 19, 2009.

(30) Foreign Application Priority Data

Jun. 2, 2008 (DE) .................. 10 2008 026 795

(51) Int. Cl.
*B60R 21/20* (2011.01)

(52) U.S. Cl. ..................................... 280/728.2; 280/740

(58) Field of Classification Search .................. 280/740, 280/728.2, 741
See application file for complete search history.

(56) References Cited

U.S. PATENT DOCUMENTS

| | | | | |
|---|---|---|---|---|
| 4,191,392 A * | 3/1980 | Barnett | ........................ | 280/740 |
| 5,577,763 A * | 11/1996 | Cuevas | ...................... | 280/728.2 |
| 5,678,848 A * | 10/1997 | Soderquist | .................. | 280/728.2 |
| 6,299,200 B1 * | 10/2001 | Bowers et al. | ............. | 280/730.2 |
| 6,349,964 B1 * | 2/2002 | Acker et al. | ............... | 280/730.2 |
| 6,814,369 B2 * | 11/2004 | Heindl | ........................ | 280/728.2 |
| 7,431,327 B2 | 10/2008 | Kretzschmar et al. | | |
| 7,597,351 B2 * | 10/2009 | Kashiwagi | .................. | 280/730.2 |
| 2003/0006595 A1 * | 1/2003 | Ozaki et al. | ..................... | 280/740 |
| 2003/0141705 A1 * | 7/2003 | Oka et al. | .................... | 280/728.2 |
| 2006/0125212 A1 | 6/2006 | Kretzschmar et al. | | |
| 2007/0029769 A1 * | 2/2007 | Katsuda et al. | ............... | 280/737 |
| 2007/0085310 A1 * | 4/2007 | Debler et al. | .................. | 280/736 |
| 2007/0200327 A1 | 8/2007 | Kloss et al. | | |
| 2007/0284862 A1 * | 12/2007 | Kashiwagi | .................... | 280/740 |
| 2008/0238059 A1 * | 10/2008 | Astrom | ......................... | 280/741 |
| 2009/0108572 A1 * | 4/2009 | Smith et al. | .................... | 280/737 |

FOREIGN PATENT DOCUMENTS

| | | |
|---|---|---|
| DE | 2698 22 159 U1 | 5/1999 |
| DE | 103 39 523 A1 | 3/2005 |
| DE | 10 2004 038 459 A1 | 3/2006 |
| DE | 10 2004 040 235 A1 | 3/2006 |
| DE | 11 2004 001 700 T5 | 8/2006 |
| EP | 1 331 141 A2 | 7/2003 |
| EP | 1 625 982 A1 | 2/2006 |
| GB | 2 406 312 A | 3/2005 |

* cited by examiner

*Primary Examiner* — Drew Brown

(74) *Attorney, Agent, or Firm* — Foley & Lardner LLP

(57) ABSTRACT

An airbag module with a gas generator, airbag, diffuser and with an airbag module housing, in particular for carrying the gas generator and the airbag is provided. The diffuser is designed as a component partially fitting tightly at the ends thereof against the gas generator, whereby the diffuser extends in the region of the gas outlet openings of the gas generator at a distance from the gas generator. The airbag module housing has in the region of the ends of the gas generator contact surfaces for the gas generator, whereby dented sections of the airbag module housing are provided as contact surfaces. The gas generator is clamped between the diffuser and the airbag module housing for arranging the gas generator on the airbag module housing, whereby the contact surfaces form first clamping points fitting against the gas generator for clamping the gas generator on the airbag module housing.

12 Claims, 2 Drawing Sheets

AIRBAG MODULE

CROSS-REFERENCE TO RELATED PATENT APPLICATIONS

This application is a Continuation of International Patent Application Number PCT/EP2009/056076, filed on May 19, 2009, which was published in German on Dec. 10, 2009 as WO 2009/14702 A1. The foregoing International Application is incorporated herein by reference in its entirety.

BACKGROUND OF THE INVENTION

The invention relates to an airbag module.

Airbag modules with a gas generator, an airbag and a diffuser are known. A passenger airbag is known from EP 1 625 982 A1 in which a component system of an airbag comprising the diffuser, the gas generator and a shell-like airbag retaining member is provided which is arranged between the airbag housing and the gas generator and which is at least partially wrapped by the lower section of the self supporting airbag. The diffuser has four pins via which all of the said components are fixed in the airbag housing. This arrangement has the advantage that the components can be pre-assembled before they are assembled into an airbag housing and that this pre-assembled module is suitable for different airbag housings. The disadvantage is that multiple components are required for fixing the gas generator and the airbag in the airbag housing. Furthermore, a considerable installation space is required.

A tubular diffuser is known from the EP 1 331 141 A2 into which a tubular gas generator can be inserted and fixed. The diffuser has a support for fixing the gas generator in the centre region and two knobs which are provided in an angular distance to each other and are designated for support against which the gas generator fits. The disadvantage of this arrangement is that the diffuser has to have on the ends thereof additional elements for axial securing the gas generator and for sealing.

SUMMARY OF THE INVENTION

The object of the invention is to design a diffuser such that additional elements on the ends of the diffuser for the sealing and axial fixing in respect to the gas generator are not required.

In case of an airbag module with gas generator, airbag and diffuser a diffuser is provided according to an exemplary embodiment of the invention which is designed as a component partially fitting tightly at the ends thereof against the gas generator, whereby the diffuser extends in the region of the gas outlet openings of the gas generator at a distance from the gas generator. Since the diffuser fits tightly at the ends thereof against the gas generator, on one hand no additional axial fixing of the gas generator is necessary and on the other hand no additional sealing is necessary on the ends of the diffuser. Furthermore, the installation space for the module gas generator/diffuser is further reduced.

According to an exemplary embodiment of the invention the diffuser is formed as a tube in case of a tubular gas generator, which fits tightly on the ends thereof against the gas generator and is designed at the end such that an annular gap is provided between the gas generator in the diffuser. It is provided in a preferred embodiment that the diffuser is made of metal, whereby the lateral ends of the metal overlap during assembling on the gas generator, and that these overlaps are fixed by at least one pin, which is furthermore designated for the fixing of the gas generator and the airbag in an airbag module housing by the means of a nut. This embodiment has the advantage besides the already mentioned advantages that the airbag can be fixed without any additional components in the airbag module and that the airbag is furthermore protected from the hot gases of the gas generator.

In the last mentioned embodiment two pins with nuts are exemplary provided on the ends of the diffuser fitting against the gas generator and the airbag module housing has preferably in the area of the ends of the gas generator contact surfaces for the gas generator. Dented sections of the airbag module housing are preferably provided as contact surfaces. The diffuser is exemplary arranged in the airbag.

The pins and the corresponding nuts can be seen in general as first and second securing elements, which interact in a suitable manner. The securing elements and the shaping of the diffuser serve in particular preferably for clamping the gas generator at the airbag module housing.

For this reason, in particular the contact surfaces define first clamping points fitted against the gas generator for clamping the gas generator at the airbag module housing, whereby in particular on the ends of the diffuser a respective second clamping point fitted against the gas generator is provided, whereby a respective second clamping point is assigned to a first clamping point and opposes the same so that a respective first and a corresponding second clamping point are arranged on both sides of the gas generator. The gas generator is preferably clamped between these clamping points for fixing the gas generator on the airbag module housing. With an appropriate design one pair of clamping points is sufficient e.g. the gas generator can be clamped in this case solely via one of its ends or a particular housing section of the gas generator on the module housing.

In so far the first and the second securing elements are designed as pin or nut the respective nut is tightened such that the diffuser pushes the gas generator via the first clamping point against the second clamping point.

A method for producing a diffuser for an airbag module, in particular for an above-mentioned airbag module, is according to the an exemplary embodiment of invention characterized in that a metal designed for the production of the diffuser is at first thermoformed in a section, in which after the assembly of the diffuser an annular gap between the gas generator and the diffuser is provided, and is subsequently rolled up to a cylinder. The assembling process of the diffuser comprises essentially only two steps. In addition, solely the insertion of diffuser openings and the holes for the insertion of the securing pins is required. However, these can be inserted before the thermoforming and rolling by punching in a known manner.

BRIEF DESCRIPTION OF THE DRAWINGS

The invention is explained on an embodiment by referring to the drawings.

DETAILED DESCRIPTION OF THE PREFERRED EMBODIMENTS

Figure 1:
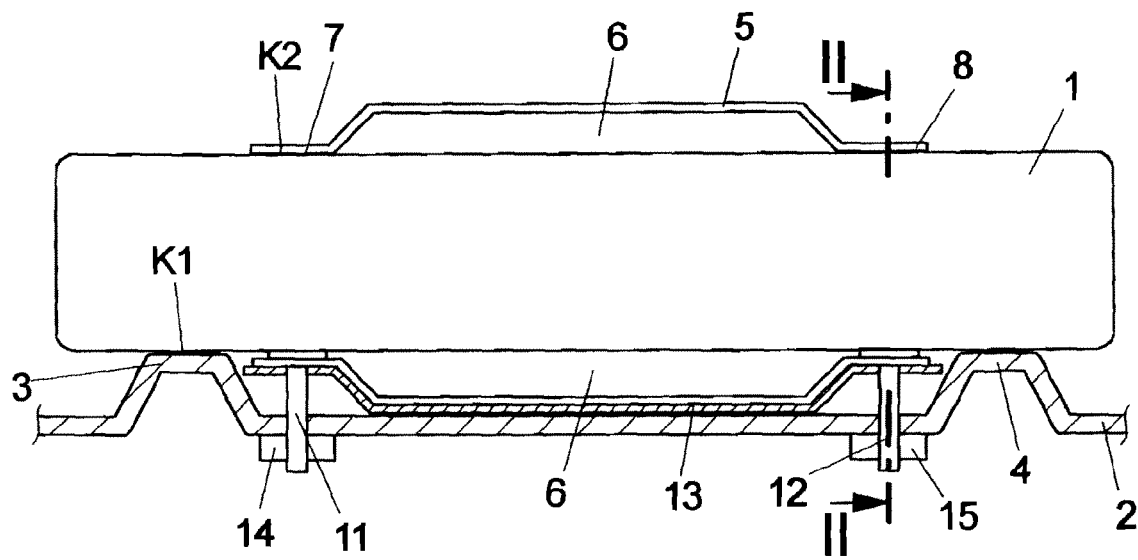
FIG. 1 shows a longitudinal section of a tubular diffuser with a tubular gas generator arranged therein.
Figure 2:
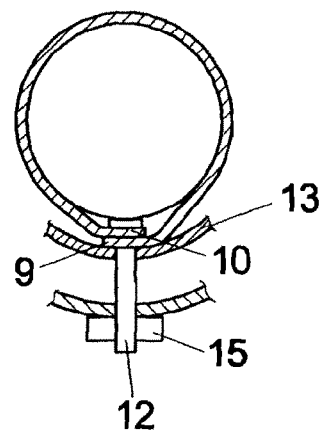
FIG. 2 shows a cross section of FIG. 1 along the line II-II.

FIG. 1 shows a gas generator in a form of a tubular gas generator 1 which is fixed in an airbag module housing 2. FIG. 1 shows only a lower section of the airbag module housing, which has dented sections 3, 4 for the support of the gas generator 1. The gas generator 1 is surrounded by a diffuser 5. The latter one consists of metal which is at first slightly thermoformed and subsequently rolled up to a cylinder. The thermal forming serves the creation of an annular gap 6 around the gas generator 1 in order to allow an annular gas flow out of the gas generator 1. On the ends 7, 8 thereof the diffuser 5 fits tightly against the gas generator 1. Through not-shown holes in the overlapping ends 9, 10 of the diffuser 5 (FIG. 2) continues a respective first securing element designed as a pin 11, 12. By the means of these pins 11, 12 the diffuser 5 is held together such that it fits tightly at the ends 7, 8 thereof against the gas generator 1. Furthermore, the pins 11, 12 serve as a retainer and positioning aid for an airbag 13 and allow for the fixing of the gas generator 1 and the airbag 13 on the airbag module housing 2 by the screw connection with second securing elements in form of nuts 14, 15. Thereby by tightening the nuts 14 on the pin 11 on the end 7 of the diffuser 5 and on the dented section 3 the clamping points K1 and K2 are coming into effect. By the tightening of the nut 15 on the pin 12 the corresponding clamping points K1, K2 on end 8 of the diffuser 5 and on the dented section 4 are becoming effective. Through this, the tubular gas generator 1 is clamped between the diffuser 5 and the airbag module housing 2. Thereby, the contact surfaces 3, 4 or clamping points K1 have along the airbag module housing 2 or along the longitudinal axis of the gas generator 1 a distance to each other which is larger than the length of the diffuser 5 encompassing the gas generator 1 along the said longitudinal axis so that the gas generator 1 rests solely via its two (from the diffuser 5 along the longitudinal axis) protruding ends on the contact surfaces 3, 4. In particular, the diffuser 5 does not have to touch thereby the housing section of the airbag module housing 2 extending between the contact surfaces 3, 4. Said housing section can however also serve as a block for the diffuser 5, via which the force with which the gas generator 1 is pushed against the contact surfaces 3, 4 can be regulated.

Figure 3:
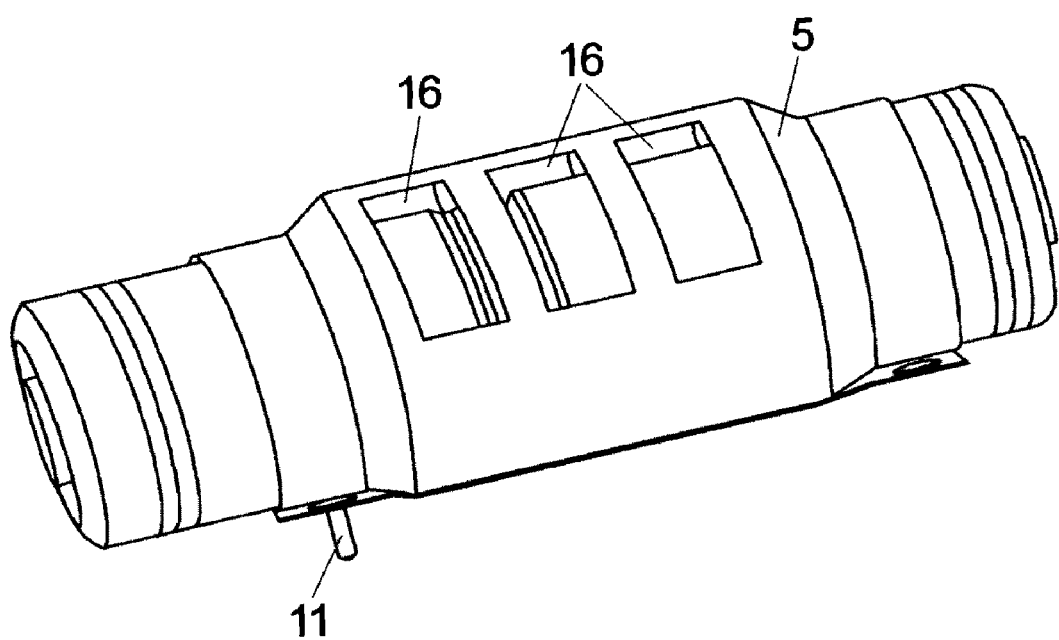
FIG. 3 shows a perspective view of the tubular gas generator with diffuser.

In FIG. 1 only a lower section of the airbag 13 is shown. In the region of the annular gap 6 the diffuser 5 has outlet openings 16 (FIG. 3) through which the gas of the gas generator 1 can flow into the airbag 13, which is not shown in FIG. 3.

During assembly the diffuser 5 is at first inserted into the airbag 13 and positioned. Thereby, the two ends 9, 10 are brought in their overlapping position and the pins are inserted through the holes provided there. Subsequently, the tubular gas generator is inserted and prepositioned. The airbag package with diffuser and tubular gas generator is subsequently positioned in the airbag module housing 2. After the axial and radial positioning of the tubular gas generator 1 and the prepositioning of the diffuser 5 the nuts 14, 15 are tightened and the assembly is completed.

The priority application, German Patent Application DE 10 2008 026 795.3; filed Jun. 2, 2008 including the specification, drawings, claims and abstract, is incorporated herein by reference in its entirety.

What is claimed is:

1. An airbag module comprising:
    a gas generator having ends and gas outlet openings;
    an airbag;
    a diffuser having ends; and
    an airbag module housing for carrying the gas generator and the airbag,
    wherein the diffuser extends in a region of the gas outlet openings of the gas generator at a distance from the gas generator,
    wherein the airbag module housing has in a region of the ends of the gas generator contact surfaces for the gas generator,
    wherein dented sections of the airbag module housing are provided as the contact surfaces,
    wherein the gas generator is clamped between the diffuser and the airbag module housing such that the gas generator is arranged on the airbag module housing,
    wherein the contact surfaces form first clamping points fitting against the gas generator for clamping the gas generator on the airbag module housing,
    wherein the diffuser is designed as a tube and the gas generator is designed as a tubular gas generator, and
    wherein said diffuser fits tightly at the ends thereof against the gas generator and is designed between the ends of the diffuser such that an annular gap is located between the gas generator and the diffuser.

2. The airbag module according to claim 1, wherein the ends of the diffuser are axial ends, wherein the diffuser is made of metal, wherein lateral ends of the metal overlap during assembly on the gas generator such that the overlapping lateral ends are fixed by at least one first securing element.

3. The airbag module according to claim 2, wherein the at least one first securing element is designed for fixing the gas generator and the airbag to the airbag module housing via at least one second securing element.

4. The airbag module according to claim 1, wherein a first securing element and a second securing element are provided on the respective ends of the diffuser fitting against the gas generator.

5. The airbag module according to claim 3, wherein the first securing element is formed by a pin and the second securing element is formed by a nut.

6. The airbag module according to claim 5, wherein the nut is tightened such that the diffuser pushes the gas generator via the first clamping point against the second clamping point.

7. The airbag module according to claim 1, wherein, on the respective ends of the diffuser, a second clamping point fitting against the gas generator is formed whereby the respective second clamping point corresponds to a corresponding first clamping point and faces the corresponding first clamping unit such the respective second clamping point and its corresponding first clamping point are arranged on both sides of the gas generator.

8. The airbag module according to the claim 1, wherein the gas generator is clamped on the airbag module housing at each of the ends of the gas generator between a respective first clamping point and a corresponding second clamping point.

9. The airbag module according to claim 1, wherein, on the respective ends of the diffuser adjacent to the respective contact surfaces, one first securing element and a corresponding second securing element are provided which interact with each other such that the diffuser pushes the gas generator over the first clamping point via the first clamping point against the second clamping point.

10. The airbag module according to claim 1, wherein the diffuser is arranged in the airbag.

11. A method for assembling a diffuser for an airbag module according to claim 1, comprising:
    first thermoforming a metal designated for production of the diffuser in a section, and
    subsequently rolling up the metal into cylinder,
    wherein, after the assembly of the diffuser, the annular gap between the gas generator and the diffuser is provided.

12. An airbag module comprising:
    a gas generator having ends and gas outlet openings;

an airbag;

a diffuser having ends; and an airbag module housing for carrying the gas generator and the airbag, wherein the diffuser is designed as a component partially fitting tightly against the gas generator at the ends of the diffuser, wherein the diffuser extends in a region of the gas outlet openings of the gas generator at a distance from the gas generator, wherein the airbag module housing has in a region of the ends of the gas generator contact surfaces for the gas generator, wherein dented sections of the airbag module housing are provided as the contact surfaces, wherein the gas generator is clamped between the diffuser and the airbag module housing such that the gas generator is arranged on the airbag module housing, wherein the contact surfaces form first clamping points fitting against the gas generator for clamping the gas generator on the airbag module housing, wherein the ends of the diffuser are axial ends, wherein the diffuser is made of metal, and wherein lateral ends of the metal overlap during assembly on the gas generator such that the overlapping lateral ends are fixed by at least one securing element.

* * * * *